2 Sheets—Sheet 1.
G. H. CORLISS.
INJECTION REGULATORS FOR CONDENSERS.
No. 177,807. Patented May 23, 1876.
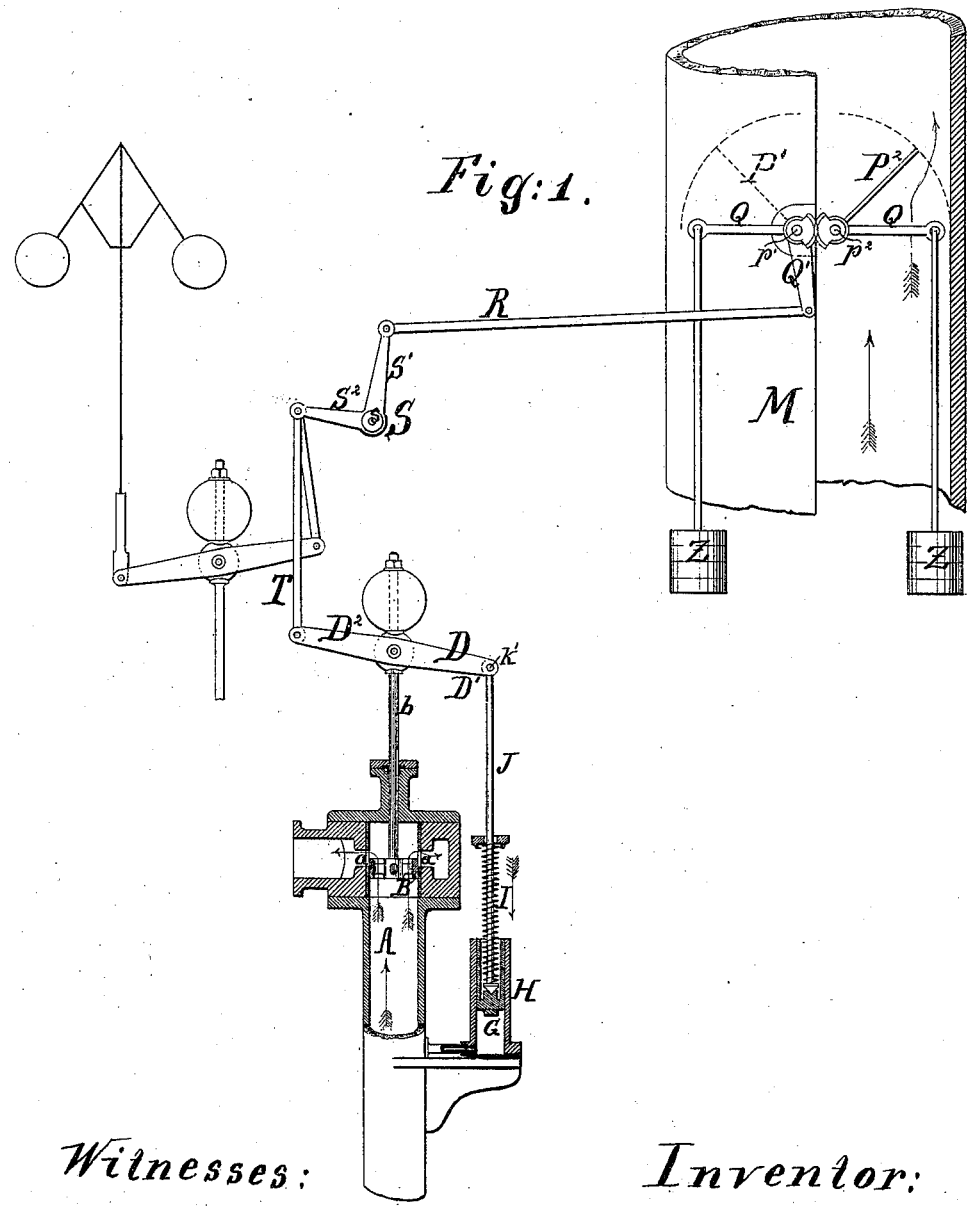
Fig: 1.
Witnesses: Inventor:

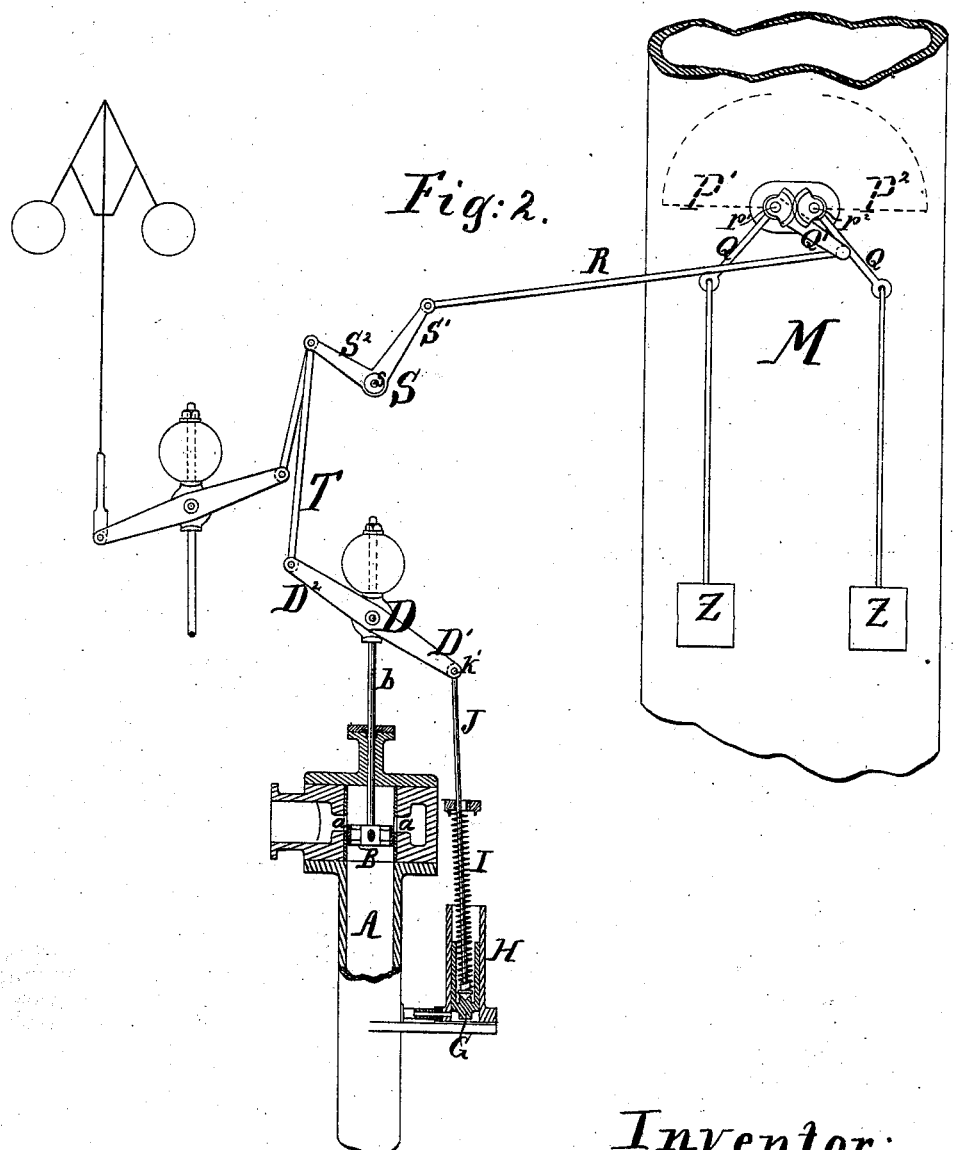

UNITED STATES PATENT OFFICE.

GEORGE H. CORLISS, OF PROVIDENCE, RHODE ISLAND.

IMPROVEMENT IN INJECTION-REGULATORS FOR CONDENSERS.

Specification forming part of Letters Patent No. 177,807, dated May 23, 1876; application filed November 18, 1875.

*To all whom it may concern:*

Be it known that I, GEORGE H. CORLISS, of Providence, in the State of Rhode Island, have invented certain Improvements relating to Injection-Regulation for Independent Air-Pumps, of which the following is a specification:

At what is known as the Hope Station, in Providence, a set of engines and pumps take a portion of the water from the principal main and pump it to supply a higher portion of the city, regulating their action according to the demands in such portion. Under such conditions it has been found expedient to maintain the vacuum in the condenser by the aid of an air-pump driven by an independent engine. I have, in another application for a patent, described means for regulating such air-pump. My present invention is for the purpose of regulating the injection-orifice which admits the water into the condenser.

It is obviously economical to take the injection-water from the principal main before it has been pumped. It would be obviously bad economy to expend power in pumping water against a high pressure, and then to allow it to flow back therefrom into the vacuum in the condenser. If a tolerable vacuum is maintained in the condenser the water will always be drawn in from the low side of the pump, which is in this case the principal main, when a sufficiently liberal aperture is provided; but it is found that the pressure of the water in the principal main, which is flowing past the pumping machinery to supply the storage-reservoir for the lower and principal portions of the city, varies very greatly under different conditions, so that more injection will sometimes flow through any given orifice. Sometimes it acts with an effect analogous to that of a water-ram. Some such effect is often experienced when the water is suddenly drawn and closed off.

In practice, the pressure of the water flowing past in the principal main varies from twenty pounds above atmosphere per square inch to a partial vacuum. Any regulation of the injection-orifice which ignores this widely-varying pressure of the injection-water would be obviously impracticable.

Among the many agencies which may be employed to control the injection-orifice, such as the varying vacuum in the condenser, the varying rate of speed of the independent air-pump, &c., (any one of which might be useful to control the injection, but none of which alone I consider fully adequate,) I conceive it sufficient to control the injection-orifice by the joint action of the varying pressure of the water and the varying rate of speed with which the water is pumped to the higher level. I have devised a simple form of apparatus by which any change in the motion of the water being pumped contributes one element, and any change in the pressure of the water on the low side of the pump, and consequently pressing into the condenser, forms another element for the regulation of the injection-orifice.

The accompanying drawings form a part of this specification, and represent what I consider the best and simplest means of carrying out the invention.

Figure 1 is an elevation with certain parts in section. This view shows medium conditions. Figure 2 is a corresponding view, showing the parts in the positions which they assume under extraordinary conditions.

There is here a slow motion of the water, resulting from the slow action of the pumping-engines. (Not represented.) This condition calls for a contracted injection-orifice; but there is also only a very low pressure of the injection-water. This latter element calls for a large injection-orifice. The result is a compromise position of the injection-valve, holding the injection-orifice nearly the same as in Fig. 1.

In both figures there are other parts intended for controlling the supply of steam to impel the air-pump. Such parts are not considered in this specification.

Similar letters of reference indicate like parts in all the drawings.

There is a principal main (not represented) through which the water flows past, with varying rates of speed and varying pressure, to supply the lower portion of the city. $A^\times$ is a branch therefrom, and $a^\times$ is a series of apertures, which may be nearly a continuous aperture, if preferred, controlled by a ring, B, mounted loosely within, and adapted to be raised and lowered by the rod $b$, which extends out through a stuffing-box, as represented. The area of aperture uncovered by the ring-valve B forms the injection-aperture for the engine or engines. (Not represented.) When the rod $b$ is lowered, the injection-aperture or area is increased. D is a lever, pivoted to the rod $b$, so that it can freely tilt or oscillate. The arm $D^1$ is controlled by the pressure of the water in the principal main, or in the branch A, through the medium of a piston subjected to the pressure of such water in one direction, and to the force of a strong spring in the other. G is the piston. It works in the cylinder H, the bottom of which is in free communication with the water in the branch pipe $A^×$. The spring I, acting against a suitable abutment, tends to depress the piston G, while the force of the water in the street main or branch A tends to elevate it. It follows that the piston G will rise and sink with each change of pressure in the street-main. J is a rod, leading from the piston G to the end $D^1$ of the lever D. Several holes may be provided to allow the point of connection $k'$ to be changed at will, so that the injection-area may be varied more or less by a given amount of motion of the piston G.

Let M represent a portion of the rising main through which the water moves after being pumped by the pump or pumps not represented. It is a main assumed to be considerably smaller than the principal main. It carries the water, under a high pressure, to the most elevated portion of the city. The rate of motion in this pipe M depends on the velocity with which the pumps not represented are acting. The quantity of injection-water required obviously depends, mainly, on the motion of the water in the pipe M. Two light shafts, $p^1$ $p^2$, extend, parallel to each other, across the rising main M, and are equipped each with an extended wing, $P^1$ $P^2$, of sheet metal, subject to the action of the current of water in the main M, which tends always to open them, and to a constant or nearly constant force tending to close them. Whenever the current of water slackens its speed, the butterfly's wings extend or partially drop down into a horizontal position, and, in the last hours of night, when little water is drawn, these valves are almost closed; but under other conditions, as when the fire-department is called out, and fire-hydrants are opened, the increased action of the pumps causes the valves or wings to lift till they are nearly parallel.

These butterfly's wings, as they change their positions, indicate the quantity of water pumped, and furnish the other controlling element which adjusts the injection-area. The motion of the water tends to lift these wings into an exactly upright position. Ordinarily they assume inclined positions, which change as the rising motion of the water in the main M increases or slackens. These shafts are geared together to insure a uniformity of motion; and an arm, Q Q, on each being loaded with an adjustable weight, Z, any desired degree of shutting-force may be applied as shall be found necessary. An arm, $Q'$, fixed on one of the shafts, operates a rod, R, which connects to one arm, $S^1$, of a bell-crank lever, S, which turns on a fixed center, $s$. The other arm, $S^2$, of this lever is connected by the rod T to the arm $D^2$ of the regulating-lever D.

The device may work successfully with only the valve or wing $P^1$ and the shaft $p^1$; but I prefer the two opposite wings $P^1$ $P^2$ on the two shafts $p^1$ $p^2$ geared together, as shown.

Operation: When, in consequence of an increased consumption of water in the high service from any cause, the main pumps (not represented) quicken their action, and the water in the rising main M commences to move faster, the butterfly-valves $p^1 p^2$ are elevated. This moves the rod R to the left and lowers the end $D^2$ of the lever D, thus lowering the rod $b$ and the valve B, and increasing the area for the injection-water. When, at the same time or at any other time, the pressure of the water in the principal main increases, such change of pressure raises the piston G, and thus, through the medium of the rod J, raises the end $D^1$ of the lever D, and thus raises the valve B to contract the area.

The invention has been for some months in practical use at Hope Station, in Providence. The harmonizing of the two controlling means does not appear to require a very high degree of skill or care to induce a successful automatic regulation, adapting the apparatus to all the varying conditions in practice. I propose to provide adjustable nuts or other convenient means for adjusting the connection of the rod $b$ to the lever D, so as to allow a change to be made by hand as the temperature of the injection-water lowers in the autumn and rises again in the spring.

With the exception of such adjustment at long intervals, to allow for changes of temperature or other disturbing agencies, the valve B is governed entirely by the joint action of the two ends of the lever D and the devices attached thereto. One-half or any other desired portion of the adjusting movement is effected by the device $P^1$, controlled by the current of the water being pumped; and one-half or some other desired portion is effected by the device G H I, controlled by the pressure on the low side of the pumps.

Modifications may be made in many of the details by any good mechanic. Thus, for example, the piston G or its equivalent may be connected indirectly to the arm $D^1$ of the controlling-lever D. For the lever D may be substituted a wheel, and for the butterfly-valves may be substituted any other convenient form of anemometer, or other device, which will properly change its position with the changes in the motion of the water; or, instead of placing the butterfly-valves or equivalent device in the water before it is pumped, they may be equally effective placed in the part of the branch main or rising main M which leads from the pumps.

I claim as my invention—

1. In steam pumping machinery, operated by condensing-engines, the wing $P^1$ and its connections, subject to the motion of the water in the main M, in combination with the injection-valve B, and adapted to increase and diminish the injection-opening by the changes in the velocity of the water being pumped, as and for the purposes herein specified.

2. The device G, actuated by the varying water-pressure on the low side of the pump, and the device $P^1$, actuated by the varying motion of the water being pumped, in combination with each other and with means D for communicating the joint effect to the valve B, as and for the purposes herein specified.

In testimony whereof I have hereunto set my hand this 6th day of October, 1875, in the presence of two subscribing witnesses.

GEO. H. CORLISS.

Witnesses:
GEORGE G. PHILLIPS,
ED. W. RAYNSFORD.